April 25, 1950     G. A. BUNYAN     2,505,094
RADAR TRAINER

Filed April 8, 1949     3 Sheets-Sheet 1

INVENTOR.
GEORGE A. BUNYAN
BY
ATTORNEY

April 25, 1950 G. A. BUNYAN 2,505,094
RADAR TRAINER
Filed April 8, 1949 3 Sheets-Sheet 2
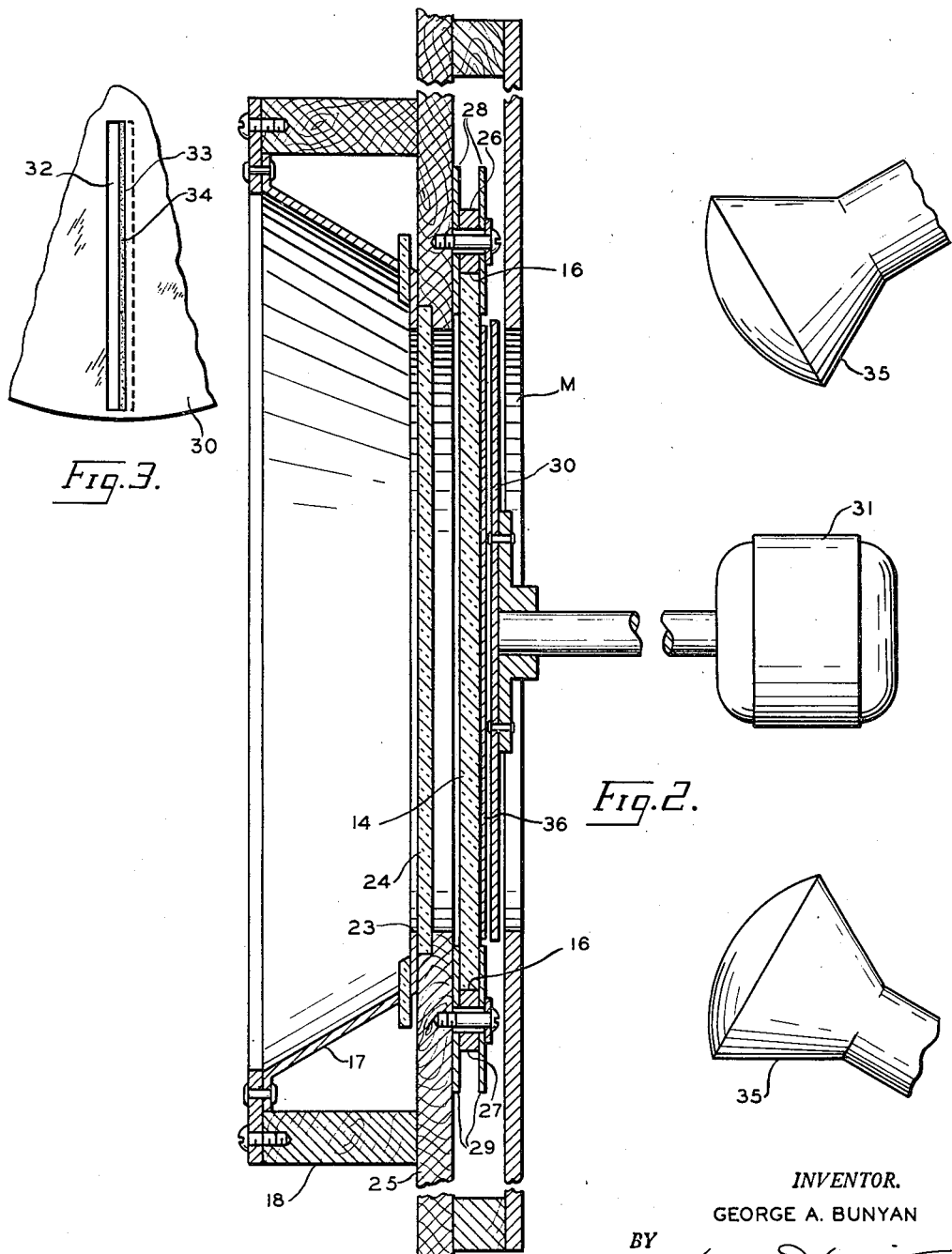
INVENTOR.
GEORGE A. BUNYAN
BY
ATTORNEY April 25, 1950 G. A. BUNYAN 2,505,094
RADAR TRAINER Filed April 8, 1949 3 Sheets-Sheet 3

INVENTOR
GEORGE A. BUNYAN
BY
ATTORNEY

Patented Apr. 25, 1950

2,505,094

UNITED STATES PATENT OFFICE 2,505,094

RADAR TRAINER

George A. Bunyan, New Rochelle, N. Y.

Application April 8, 1949, Serial No. 86,287

7 Claims. (Cl. 35—10.4)

This invention relates generally to radar trainers, and more particularly to systems for training operators in the use of radar equipments, and in the appearance of plan position indicator screens of radar equipments during relative motion of a craft with respect to land masses or other targets.

Radar trainers of various types, based upon a wide variety of principles, have been devised and utilized. These have, however, insofar as I am presently aware, been of relatively complex character electrically or electronically, the presentation being actually provided on the face of a cathode ray tube indicator.

It is an object of the present invention to provide a radar trainer of simple construction, which shall be economical of fabrication and substantially free of maintenance requirements, yet which shall provide all the essential features and advantages of more complex devices.

It is a further object of the invention to provide, by means of non-electronic devices, simulated moving plan position indications of the character of those normally presented by a cathode ray tube indicator.

More specifically, it is an object of the present invention to provide a simulated plan position indication by means of a phosphorescent representation of a chart portion, irradiated by ultraviolet light, or the like.

It is a further object of the present invention to provide a simulated plan position indication by rotating a radial slot between a source of ultra-violet illumination and a translucent screen having thereon a phosphorescent representation of a chart.

It is another object of the invention to provide a radar trainer having a simulated vessel moving over a chart, and a simulated plan position indication of the appearance of land masses and targets, as viewed from the vessel as it moves.

It is still a further object of the invention to provide a system of radar training wherein "jamming," or radio interference with a radar equipment, is simulated.

The above and still further objects, features and advantages of the present invention will become apparent upon consideration of the following detailed description of a specific embodiment thereof, especially when taken in conjunction with the accompanying drawings, wherein:

Figure 2 is a transverse section taken on the line 2—2, and illustrating the mechanism for providing a display simulating a plan position display on the face of a cathode ray tube indicator;

Figure 3 is a fragmentary detail, in plan, of a scanning disc illustrated in section in Figure 2.

Figure 1:
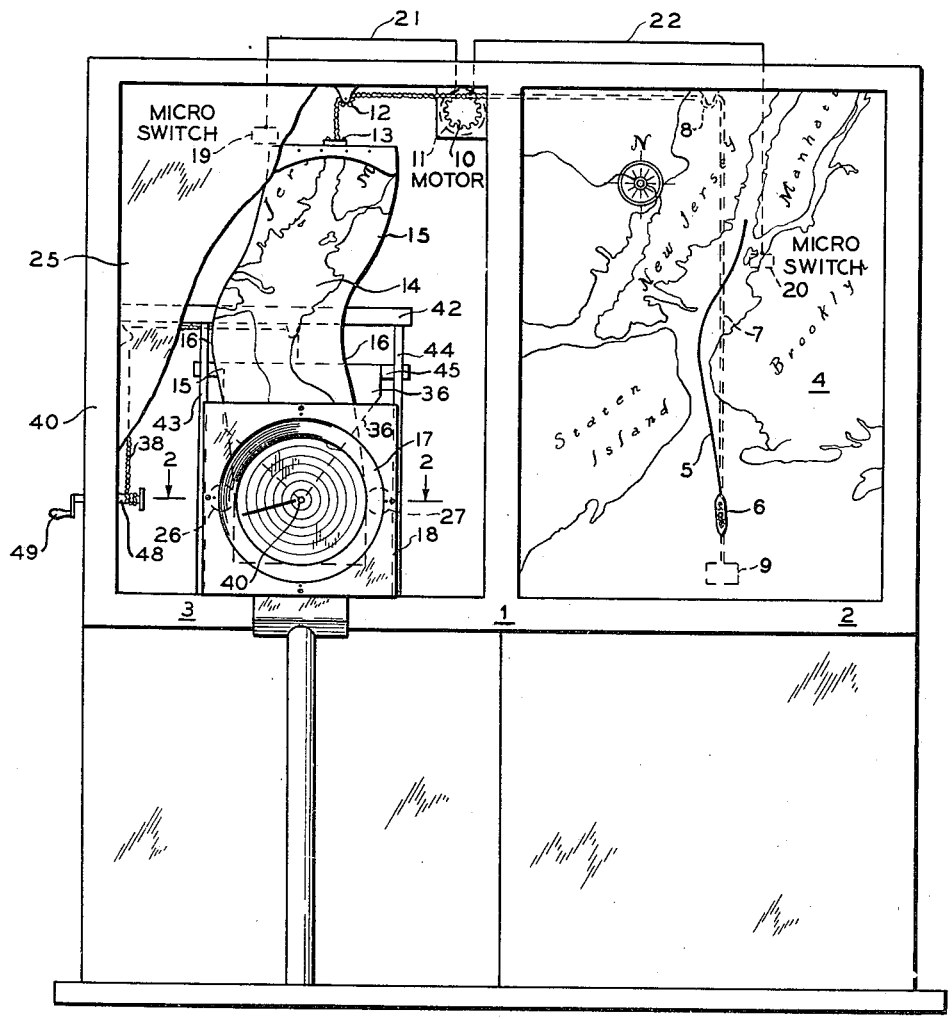
Figure 1 is a view in elevation of the system of my invention as viewed by a trainee, certain portions thereof being removed to illustrate mechanical features of the system.

Briefly described, the present invention involves a chart having a slot therein, the slot being generally sinuous and serving to guide a simulated vessel with respect to the chart. Juxtaposed with respect to the chart is a simulated cathode ray type plan position display of terrain and target features of the chart as viewed from the vessel. To produce the display I utilize a translucent or transparent member, having sides duplicating in sinuosity the slot above referred to, and containing on the surface thereof a phosphorescent or fluorescent duplication of the terrain features, and other features, shown on the chart.

The vessel and the translucent or transparent member are suspended for movement in opposite directions, in synchronism, so that for each position of the simulated vessel with respect to the chart a point of the translucent or transparent member corresponding with the vessel's position arrives at a predetermined point. Surrounding this point is a frame, simulating a plan position indicator of a radar equipment, the frame setting off a transparent circular viewing surface. The translucent or transparent member is irradiated with ultra-violet light and the coated portion thereof glows, that portion of the glowing surface which instantaneously corresponds with, or is aligned with, the circular viewing surface being alone visible to the trainee, to whom is thus evident a softly glowing simulation of terrain features immediately surrounding a vessel, the latter occupying a position as indicated by reference to the chart.

More closely to simulate a plan position display of a radar equipment the phosphorescent material is not simultaneously irradiated over a large surface thereof, but its irradiation is caused to occur via a radial rotating slot, which rotates concentrically with the circular viewing surface, thereby simulating the rotating radial trace of a cathode ray type of display. Moreover, to the edge of the slot may be secured a strip of transparent material coated along its edge with phosphorescent material, which serves to accentuate the glow along the radial, as it rotates.

The normal "jamming" pattern, on the face of the cathode ray tube indicator of a radar receiver-indicator, arranged for PPI display, corresponds with an irradiated or illuminated angular sector of the display, the sector having its apex at the center of the display. A modification of the display provided by the present system to represent "jamming" is made available in a structure in accordance with the present invention, by providing a transparent sheet coated with luminous paint over an angular sector corresponding with the desired join display, and by providing mechanism for interposing the sector between the radial slot and the translucent or transparent member containing the luminous terrain features. Thereby the "jam" sector, rather than the terrain features, is irradiated with ultra-violet light, over that portion of the PPI display which corresponds with the "jam" sector, the appearance of the PPI display corresponding, then, with that encountered on an actual equipment during jamming.

Referring now more specifically to the drawings, the reference numeral 1 denotes a frame, divided for purposes of description into a right hand portion 2 and a left hand portion 3, the right hand portion containing a chart 4, secured to a backing board to provide adequate strength, and which in the present embodiment of my invention represents the waters adjacent to New York Harbor. A slot 5 is provided in the chart, and in its backing board, following generally the path normally taken by a vessel in approaching New York Harbor. A simulated vessel 6 rides in this slot, mechanism being provided for alternately slowly moving the vessel from one end of the slot 5 to the other. For this purpose the vessel 6 is suspended from one end of a chain 7, or the like, which runs over a pulley 8, disposed symmetrically with respect to the slot 5 adjacent the upper end of the right hand portion 2 of the equipment, and the vessel 6 is normally biassed for movement downwardly by a weight 9 secured thereto, being restrained against downward movement by the chain 7.

The chain 7 is actuated by a sprocket 10, driven by a reversible electric motor, generally represented at 11, the chain 7 running from the sprocket 10 over an idler pulley 12, and an end 13 thereof being secured to a transparent or translucent strip 14.

The strip 14 may be fabricated of Lucite, Celluloid, or the like and may have depicted on its rearward surface, as luminously painted areas 15, a duplication of a portion of the chart 4, and specifically that portion lying equally on opposite sides of the slot 5, the side walls 16 of the strip 14 following precisely the sinuosity of the slot 5.

The strip 14 is then raised and lowered, as the vessel 6 is lowered and raised, and since both the vessel 6 and the strip 14 are secured to opposite ends of chain 7, that point of the strip 14 corresponding with the instantaneous position of the vessel 6 on the chart 4, is maintained continuously centrally of a circular frame 17, secured in a rectangular casing 18.

Movement in alternate directions, successively, by the simulated vessel 6 and by the strip 14, is controlled by means of micro-switches, 19 and 20, the switch 19 being closed by the upper edge of the strip 14 when the latter arrives at its uppermost position, the simulated vessel 6 being then at the lowermost point of its path within the slot 5, and the switch 20 being closed by the counterweight 9 when the simulated vessel 6 arrives at its uppermost position in the slot 5, the strip 14 being then in its lowermost position.

The circuits for causing the motor 11 to reverse in response to alternate closures of switches 19 and 20, respectively, have not been illustrated in detail, since suitable circuits for the purpose are well known, and are not, per se, part of my invention. The circuits extending between microswitches 19, 20 and the motor 11, are indicated, however, by the leads 21 and 22, respectively.

Reference is now made to Figure 2 of the drawings, wherein is illustrated the casing 18 and the circular frame 17, the latter being now seen to be of frusto-conical cross-section, and having a circular aperture 23, covered by a transparent viewing surface 24.

The casing 18 is secured in any convenient fashion to a wall 25, to the rearward side of which is secured a pair of rollers, 26, 27, and a pair of guides 28, 29, the strip 14 riding between the guides and the edges 16 of the strip 14 riding on the rollers 26, 27, which, together, guide and restrain the strip 14 during its motion, and despite the sinuous character of the edges 16 thereof, retain it always in alignment with the transparent viewing surface 24.

A further metallic or non-transparent disc, 30, is provided, which is arranged to be concentric with, and co-extensive with the viewing surface 24, and to be rotated by a motor 31, at some convenient relatively slow speed, substantially that of the rotating antenna of a conventional radar equipment. The disc 30 contains a radial slot 32 (Figure 3), along one edge 33 of which is provided a strip of transparent material 34, preferably Lucite, which is coated with luminous paint. Behind the disc 30 is located one or more sources 35 of ultra-violet light, suitable for exciting the phosphorescent material coated on the illuminated side of strip 14. The light from the source or sources 35 reach the strip 14 only via the radial slot 32, and its luminous strip 34, and accordingly a continuously rotating luminous radial is provided by the luminous strip 34, and also by the light passing through the slot 32 and impinging on the strip 14. As the slot 32 rotates, the luminous trace is apparently developed in successive radials, as is true of the development of a plan position indication in a true radar equipment. The phosphorescent material is selected to have appreciable decay of luminescence between successive traces, more truly to simulate the action of a cathode ray tube indicator.

Via the transparent viewing surface 24 may be seen, then, a continuously varying luminous trace of terrain features as they would appear when viewed from the vessel 6, as the latter moves, the luminous trace being developed by a rotating radial, as in normal radar technique, and hence simulating with great exactitude the appearance and action of the indicator of a radar equipment.

A mask M may be interposed between disc 30 and luminous sources 35, which may comprise a circular aperture in an otherwise opaque shield. Thereby irradiation of strip 14 over area outside those intended to display is effectively prevented.

Figure 4:
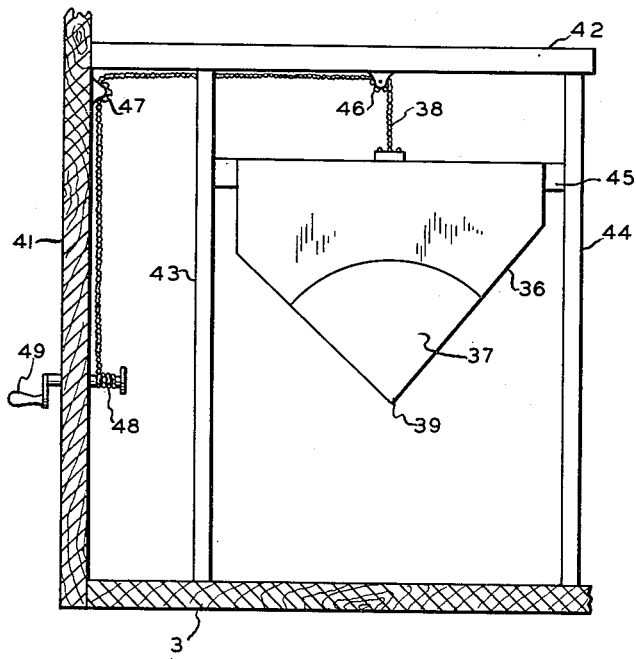
Figure 4 is a front elevation of a positioning mechanism for the jam simulating mechanism.
Figure 5:
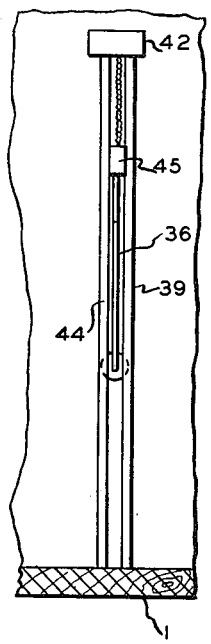
Figure 5 is a view in elevation of the structure of Figure 4.

Reference is now made to Figures 4 and 5 of the accompanying drawings, wherein is illustrated a modification of the system of Figures 1–3, inclusive, for enabling presentation of a "jammed" display. To this end the disc 30 is spaced sufficiently from the strip 14 to enable interposition of a transparent strip 36, fabricated of Lucite or the like, on which has been coated a pattern of luminous paint 37 over a sector of a circle at least equal in radius to the radius of the viewing surface 24. The sector may subtend an arc of approximately 60°, suggested for example only, and not by way of limitation. The strip 36 may be suspended via a chain 38, or the like, with its apex 39 at the center 40 of the display surface 24.

The fluorescent jam sector 37 is then irradiated by the luminous sources 35, rather than the chart 14, where these are superposed, and the brilliant continuous glow of the jam sector 37 becomes visible to the trainee, the terrain features present on the chart being practically invisible against the background provided by the jam sector 37. Those portions of the chart 14 which are not in superposed relation to the jam section 36, are unaffected by the presence of the latter, and provide the normal display.

In Figures 4 and 5 of the accompanying drawings is illustrated the structure of the jam sector simulator 37, and of mechanism for positioning the latter in viewing position, and for removing the latter from the field of view.

Secured to the frame 1 of the trainer, and more particularly to a vertical wall 41 thereof, and extending parallel to the base wall 3, is a supporting beam 42, having two space guides 43 and 44, extending therefrom to the base wall 3.

Each of the guides 43 and 44 comprises a spaced pair of wooden stanchions. Extending between guides 43 and 44, and guided between the stanchions, is a cross bar 45, to which is secured by any convenient means the Lucite strip 36 carrying the fluorescent jam pattern 37.

The cross bar 45 is suspended by means of chains 38, which extends over an idler pulley 46 secured to supporting beam 42, and therefrom to a further idler 47 secured to side wall 41 adjacent to supporting beam 42, and thence to a crank shaft 48 extending through the wall 41 and having there a hand-crank 49 secured thereto.

Rotation of the hand-crank 49 effects raising or lowering of the Lucite strip 36, out of or into viewing position, as it is desired to simulate jamming and to provide a normal display.

The structure illustrated and described obviously simulates a fixed jamming pattern. Modifications of the structure to simulate jamming patterns having adjustable directivities or points of origin will readily suggest themselves to those skilled in the art, in the light of applicant's disclosure.

While I have described and illustrated specific embodiments of my invention, it will be evident that variations thereof may be resorted to, and modifications effected, without departing from the true spirit and scope of the invention, which is defined in the appended claims.

What I claim and desire to secure by Letters Patent of the United States is:

1. In a radar trainer, a chart, a simulated vessel movable with respect to said chart, a strip containing a fluorescent duplication of at least portions of said chart, a viewing screen for viewing instantaneously portions only of said strip surrounding the instantaneous positions of said simulated vessel, means for causing said fluorescent duplication to glow, and means for synchronously moving said simulated vessel and said strip.

2. In a radar trainer, a chart, a simulated vessel movable with respect to said chart, a strip containing a fluorescent duplication of at least portions of said chart, a viewing aperture for viewing instantaneously a portion only of said strip corresponding with an area surrounding the instantaneous position of said simulated vessel, means for moving said vessel repetitively over a predetermined path, means for simultaneously moving said strip to maintain within said viewing apparatus a portion of said strip corresponding with the area surrounding the instantaneous position of said simulated vessel, and means for causing said fluorescent duplication to glow.

3. In a radar trainer, a chart, a simulated vessel movable with respect to said chart, a strip containing a fluorescent duplication of at least portions of said chart, a viewing aperture for viewing instantaneously a portion only of said strip corresponding with an area surrounding the instantaneous position of said simulated vessel, means for moving said vessel repetitively over a predetermined path, means for simultaneously moving said strip to maintain within said viewing apparatus a portion of said strip corresponding with the area surrounding the instaneous position of said simulated vessel, and means for causing said fluorescent duplication to glow, comprising a source of light, means interposed between said source of light and said strip and comprising a generally opaque member partially masking said strip, said generally opaque member comprising a slot transparent to said light, said slot being narrow and radial, and means for rotating said generally opaque member.

4. In a radar trainer, a chart, a simulated vessel movable with respect to said chart, a strip containing a fluorescent duplication of at least portions of said chart, a viewing aperture for viewing instantaneously a portion only of said strip corresponding with an area surrounding the instantaneous position of said simulated vessel, means for moving said vessel repetitively over a predetermined path, means for simultaneously moving said strip to maintain within said viewing apparatus a portion of said strip corresponding with the area surrounding the instantaneous position of said simulated vessel, and means for causing said fluorescent duplication to glow, comprising a source of light, means interposed between said source of light and said strip and comprising a generally opaque member partially masking said strip, said generally opaque member comprising a slot transparent to said light, said slot being narrow and radial, and means for rotating said generally opaque member, said generally opaque member adjacent said slot having secured thereto a quantity of fluorescent material visible through said viewing aperture and continuously illuminated by said source of light.

5. A simulated cathode ray tube presentation, comprising, a translucent surface coated with fluorescent material, means for irradiating said fluorescent material, a circular masking means for visually presenting only a portion of said translucent surface, means for moving said translucent surface continuously with respect to said masking means, and further masking means comprising a rotating member having a radial transparent slot therein interposed between (1) said means for irradiating and said masking means, and (2) said translucent surface, the center of rotation of said rotating member and the center of said circular masking means being co-axial.

6. The combination in accordance with claim 1 wherein is further provided means for simulating radar jamming on said viewing screen.

7. The combination in accordance with claim 1, wherein is further provided a translucent strip coated with fluorescent material, said translucent strip interposed between said viewing screen and said means for causing said fluorescent duplication to glow.

GEORGE A. BUNYAN.

REFERENCES CITED

The following references are of record in the file of this patent:

UNITED STATES PATENTS

| Number | Name | Date |
|---|---|---|
| 2,252,083 | Luck | Aug. 12, 1941 |
| 2,399,661 | Bowie | May 7, 1946 |
| 2,438,888 | Andrews | Apr. 6, 1948 |
| 2,443,631 | McDermott | June 22, 1948 |
| 2,454,503 | Crane | Nov. 23, 1948 |